United States Patent
Matsuzawa (10) Patent No.: US 8,804,274 B1
(45) Date of Patent: Aug. 12, 2014

(54) DISK STORAGE APPARATUS AND SERVO CONTROL METHOD

(71) Applicant: Kabushiki Kaisha Toshiba, Tokyo (JP)

(72) Inventor: Takuji Matsuzawa, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/018,269

(22) Filed: Sep. 4, 2013

(30) Foreign Application Priority Data

Apr. 18, 2013 (JP) .................................. 2013-087705

(51) Int. Cl.
*G11B 21/02* (2006.01)
*G11B 5/596* (2006.01)

(52) U.S. Cl.
USPC ..... 360/75; 360/77.04; 360/77.08; 360/78.04

(58) Field of Classification Search
USPC .......... 360/78.14, 77.08, 77.02, 77.04, 78.04, 360/75, 76, 78.07, 55
See application file for complete search history.

(56) References Cited

U.S. PATENT DOCUMENTS

| RE39,831 E | 9/2007 | Le et al. |
| 7,515,375 B2 * | 4/2009 | Takaishi ..................... 360/78.07 |
| 7,586,709 B2 * | 9/2009 | Fukushima et al. ............ 360/75 |
| 7,826,168 B2 * | 11/2010 | Takaishi ..................... 360/77.04 |
| 8,009,382 B2 * | 8/2011 | Takaishi ..................... 360/77.02 |
| 8,514,512 B2 * | 8/2013 | Takaishi ..................... 360/77.08 |

FOREIGN PATENT DOCUMENTS

| JP | 2003-157629 | 5/2003 |
| JP | 2004-335045 | 11/2004 |
| JP | 2006-277833 | 10/2006 |

\* cited by examiner

*Primary Examiner* — Ali Neyzari
(74) *Attorney, Agent, or Firm* — Knobbe, Martens, Olson & Bear, LLP (57) ABSTRACT

According to one embodiment, a disk storage apparatus includes a read controller and a servo controller. The read controller contains a combined position generator including a state observer and a combined position calculator. The servo controller controls a seek operation of the head based on the combined position. The servo controller stores the servo information in a memory and determines an occurrence of a state offset as an error between an actual position of the head and the combined position. The servo controller corrects the predicted position by the state observer based on the servo information stored in the memory and the combined position when the occurrence of the state offset is detected.

16 Claims, 7 Drawing Sheets

DISK STORAGE APPARATUS AND SERVO CONTROL METHOD

CROSS-REFERENCE TO RELATED APPLICATIONS

This application is based upon and claims the benefit of priority from Japanese Patent Application No. 2013-087705, filed Apr. 18, 2013, the entire contents of which are incorporated herein by reference.

FIELD

Embodiments described herein relate generally to a disk storage apparatus and a servo control method.

BACKGROUND

In recent years, in the field of the disk storage apparatus such as a hard disk drive (hereinafter, abbreviated simply as a disk drive), higher recording densities of a disk as a storage medium are promoted. In the disk drive, servo areas (also called a servo frames) are arranged at fixed intervals in a circumferential direction on the disk. The each servo area is a recording area of servo information. The servo information is position information to detect the position of a head over the disk. The servo information includes a cylinder number (track number) to identify the position of a cylinder (track) and a sector number to identify a sector in the cylinder.

Incidentally, a servo information division method of dividing and recording cylinder information constituting the cylinder number to identify one cylinder in a plurality of servo areas in a cylinder is proposed in order to implement high-recording density of a disk. Similarly, a method of dividing and recording the sector number in the plurality of servo areas is proposed. Because the size of each servo area can be reduced by these methods, a data area where user data is recorded for each cylinder can, as a result, be increased.

According to the servo information division method, because cylinder information is divided into a plurality of servo frames, the current position or current velocity during seeks cannot be correctly obtained when seeks are done from the current position to a target position. Thus, seek control using a combined position from a predicted position by a state observer as the current position and obtained cylinder information is performed. In this case, a state offset as an error between the combined position and a predicted velocity by the state observer, and an actual position and an actual velocity of the head may respectively occur due to factors such as a disturbance. The seek control is performed using the position. In this case, a state offset as an error between an estimated position of the state observer and the actual position of the head based on servo information may occur due to factors such as a disturbance. During such a state offset occurred, the precision of seek control is degraded so that the head may not be able to reach the target position.

DETAILED DESCRIPTION

In general, according to one embodiment, a disk storage apparatus includes a disk, a read controller, and a servo controller. The disk has servo information to detect a position in a radial direction divided and recorded into a plurality of servo areas. The read controller reads the servo information from each of the servo areas using a head. The servo controller calculates a combined position based on the servo information read from each of the servo areas by the read controller and a predicted position calculated by the state observer. The servo controller controls a seek operation of the head based on the combined position. The servo controller stores the servo information read during the seek operation in a memory and determines an occurrence of a state offset as an error between an actual position of the head and the combined position. Further, the servo controller corrects the predicted position by the state observer based on the servo information stored in the memory and the combined position when the occurrence of the state offset is detected.

Various embodiments will be described hereinafter with reference to the drawings.

[Disk Drive Configuration]

Figure 1:
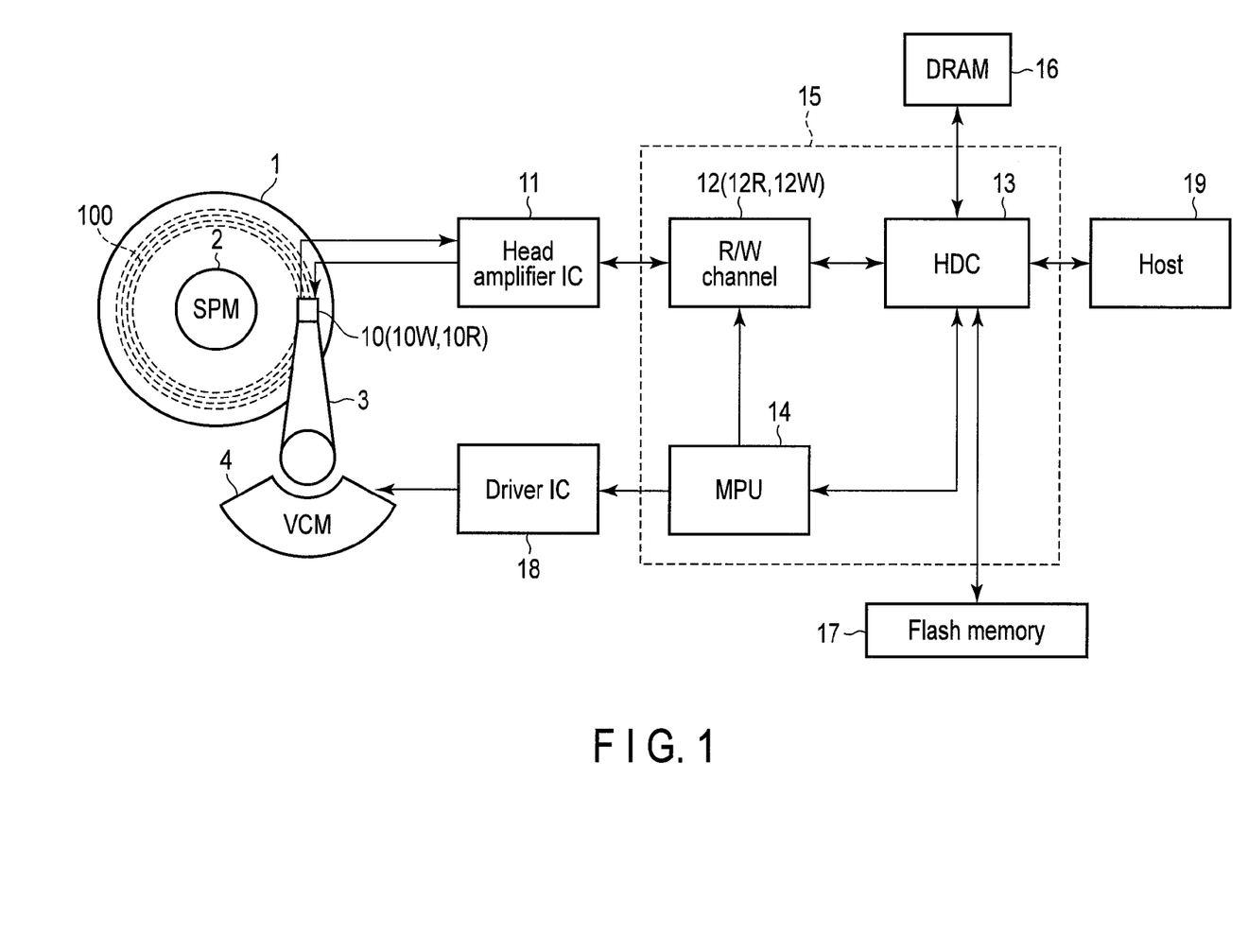
FIG. 1 is a block diagram illustrating the configuration of a disk drive according to an embodiment.

FIG. 1 is a block diagram showing principal units of a disk drive according to the present embodiment.

As shown in FIG. 1, the disk drive is roughly configured by a head-disk assembly (HDA), a head amplifier integrated circuit (hereinafter, a head amplifier IC) 11, a controller 15, and a driver IC 18.

The HDA includes a disk 1 as a storage medium, a spindle motor (SPM) 2, an arm 3 mounted with a head 10, and a voice coil motor (VCM) 4. The disk 1 is rotated by the spindle motor 2. The arm 3 and the VCM 4 constitute an actuator and cause the head 10 to move (seek) to a target position on the disk 1. That is, the actuator moves the head 10 mounted on the arm 3 in a radial direction on the disk 1 by being driven by the VCM 4. The VCM 4 is controlled to be driven by a driving current from the driver IC 18.

A large number of cylinders (tracks) 100 where data is recorded are configured on the disk 1. The head 10 has a slider as a main body thereof and includes a write head 10W and a read head 10R mounted on the slider. The read head 10R reads data recorded in the cylinder 100 on the disk 1. The write head 10W writes data onto the disk 1. Data includes servo information described later and user data. Incidentally, the head 10 includes at least two units and writes data onto or reads data from both sides of the one disk 1.

The head amplifier IC 11 includes a read amplifier and a write driver. The read amplifier amplifies a read signal read by the read head 10R and transmits the signal to a read/write (R/W) channel 12. On the other hand, the write driver transmits a write current in accordance with write data output from the R/W channel 12 to the write head 10W.

The controller 15 is configured by a 1-chip integrated circuit including the R/W channel 12, a hard disk controller (HDC) 13, and a microprocessor (MPU) 14. The R/W channel 12 includes a read channel 12R and a write channel 12W. The read channel 12R decodes, as will be described later, data (including servo information) by processing a read signal read by the read head 10R. The write channel 12W performs signal processing of write data from the HDC 13.

The HDC 13 controls data transfer between a host 19 and the R/W channel 12. The HDC 13 performs data transfer control by controlling a buffer memory (DRAM) 16 to temporarily store read data or write data in the buffer memory 16. The HDC 13 also controls a flash memory 17 to use, for example, as a cache area where data is temporarily stored.

The MPU 14, which may also be called a micro controller, performs positioning control (servo control) of the head 10 by controlling the VCM 4 via the driver IC 18. Further, the MPU 14 controls recording and reproduction of data via the R/W channel 12.

[Servo System Configuration]

Figure 2:
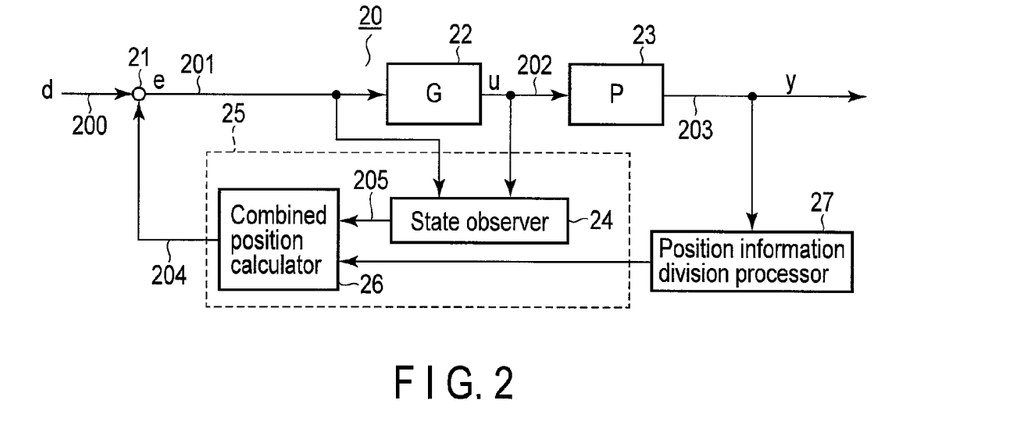
FIG. 2 is a block diagram illustrating the concept of a servo system according to the embodiment.

As shown in FIG. 2, a servo system 20 that performs servo control that positions the head 10 in a target position on the disk 1 is incorporated into a disk drive in the present embodiment. The servo system 20 is realized not only by the function of the MPU 14 including software, but also by the decoding function of servo information of the R/W channel 12 and the drive control function of the VCM 4 by the driver IC 18.

As shown in FIG. 2, the servo system 20 includes a positional error computing unit 21, a feedback controller (transfer function G) 22, and a combined position generator 25. The combined position generator 25 includes a state observer 24 and a combined position calculator 26. The positional error computing unit 21 calculates a position error (e) 201 between a target position (d) 200 of the head 10 and a combined position 204 calculated by the combined position generator 25.

The feedback controller 22 is a function realized by the MPU 14 and controls a plant (transfer function P) 23 so as to eliminate the positioning error (e) 201 by outputting a control value (u) 202. The plant 23 is an actuator including the VCM 4 and controls the head 10 to move up to the target position (d) 200. The state observer 24 has an internal model realized by an operation of the MPU 14. The state observer 24 calculates a current position (predicted position) 205 of the head 10 by inputting the control value (u) 202 from the feedback controller 22 and the positioning error (e) 201. The combined position calculator 26 calculates the combined position 204 based on a value obtained by output (y) 203 from the plant 23 being divided by a position information division unit 27 and the predicted position 205 of the state observer 24.

[Servo Control]

The servo control in the present embodiment will be described below with reference to FIGS. 3 to 9D.

Figure 3:
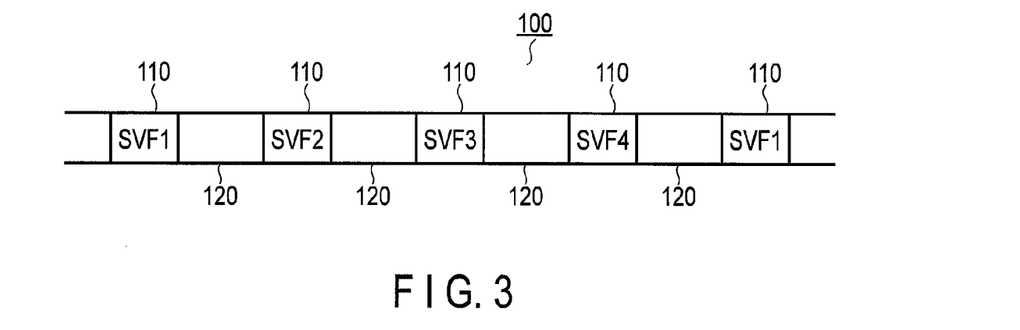
FIG. 3 is a diagram illustrating the configuration of a servo area according to the embodiment.

As shown in FIG. 3, a plurality of servo areas (servo frames) 110 are arranged at fixed intervals in each of the cylinders 100 on the disk 1 in the present embodiment. An area between the servo areas 110 is a data area 120 where user data is recorded. In the present embodiment, servo information is divided and recorded in the four servo areas 110 and the four divided servo areas will be handled as four kinds of servo frames SVF1 to SVF4, for the sake of convenience. Incidentally, servo information may be divided and recorded in, for example, eight servo areas.

Figure 4:
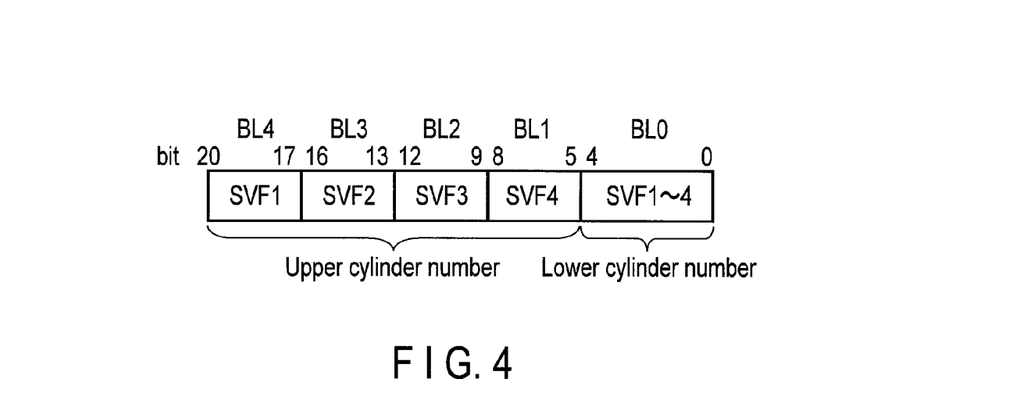
FIG. 4 is a diagram illustrating an example of divided servo information according to the embodiment.

Servo information contains cylinder information to detect the cylinder position as the current position of the head 10. Cylinder information includes cylinder numbers to identify each of the cylinders 100. The cylinder number is configured as, for example, 21-bit code. In the present embodiment, as shown in FIG. 4, an upper cylinder number of the cylinder number is divided and recorded in the four servo frames SVF1 to SVF4. The divided upper cylinder numbers are defined as 4-bit cylinder values BL1 to BL4. Four-bit groups of the upper cylinder numbers are written as blocks for the sake of convenience. A lower cylinder number is stored in each of the four servo frames SVF1 to SVF4 in common. The lower cylinder number is defined as a 5-bit cylinder value BL0.

In a disk drive, the MPU 14 performs servo control to seek and position the head 10 at the target cylinder on the disk 1 to perform a read/write operation of user data from/to the target cylinder. To perform servo control, it is necessary for the MPU 14 to read the divided upper cylinder numbers from the four servo frames SVF1 to SVF4 to determine the current position (current cylinder number) of the head 10. That is, the MPU 14 can determine the upper cylinder of the current position by combining the cylinder values BL1 to BL4 read as four samples.

When sampling and reading servo information, the MPU 14 can read the lower cylinder number (cylinder value BL0) from any of the servo frames SVF1 to SVF4 as each sample. Finally, the MPU 14 determines the current position (current cylinder number) of the head 10 from the combined upper cylinder number and the lower cylinder number.

Particularly when the head 10 is moving at some velocity during seek operation, the upper cylinder number read as a past sample may have changed from the number when read due to the change of cylinder for each sample. Thus, the MPU 14 may erroneously determine the current position of the head 10. The position, velocity and the like can be determined by using the state observer 24. However, the predicted state contains an error and thus, the correct current state of the head cannot be determined.

Therefore, the servo system 20 in the present embodiment combines upper cylinder information of the predicted position of the current position of the head 10 calculated by the state observer 24 and the read lower cylinder information. Further, the servo system 20 can avoid a situation in which the current position of the head 10 is erroneously determined by calculating a combined position in which the influence of an error of lower information of an actual position caused by a prediction error of the state observer 24 is reflected in the upper cylinder. The method of calculating a combined position will be described in detail below.

The state observer 24 has a prediction error for several cylinders, but lower cylinder information can be obtained for each sample. Thus, the influence of a prediction error of the state observer 24 can be eliminated by combining upper cylinder information of a predicted position of the state observer 24 and the read lower cylinder information. However, if upper cylinder information of the state observer 24 and the read lower cylinder information are simply combined, the simply combined position does not match the actual position if upper cylinder information of the state observer 24 and upper cylinder information of the actual position are different due to a prediction error of the state observer 24. Thus, lower cylinder information of the state observer 4 and the read lower cylinder information are compared and upper cylinder information of the state observer 24 corrected by ±1 and the read lower cylinder information are combined to calculate the combined position.

A case when, for example, the predicted position of the state observer 24 is 31-cylinder (upper cylinder information is 0 and lower cylinder information is 31) and the actual position is 35-cylinder (upper cylinder information is 1 and lower cylinder information is 3) is assumed. In this case, if the upper cylinder information of the state observer 24 is simply combined with the read lower cylinder information, 3-cylinder (upper cylinder information is 0 and lower cylinder information is 3) results and does not match the actual position. In this example, the difference 28 between respective lower cylinder information is sufficiently larger than a designed prediction error and thus, the upper cylinder information of the state observer 24 is presumed to be smaller by 1 due to the prediction error. Therefore, a position obtained by combining upper cylinder information obtained by adding 1 to the upper cylinder information of the predicted position of the state observer 24 with the read lower cylinder information is set as the combined position. In this example, the value obtained by adding 1 to the upper cylinder information of the predicted position of the state observer 24 is 1 and thus, the combined position becomes 35-cylinder and matches the actual position.

However, when, as described above, the upper cylinder number is divided among the servo frames SVF1 to SVF4, prediction errors used for correcting a prediction result of the state observer 24 are limited to the obtained upper cylinder value and the lower cylinder value. If the stability or the like of seeks when the combined position and the actual position of the head 10 differ greatly is considered, there are some cases when it is better not to use the obtained upper cylinder value. If, for example, only a portion of the upper cylinder value is obtained and the upper value or lower value of the obtained cylinder value is unclear, the correction of a predicted value by the state observer 24 becomes incorrect. Thus, a situation in which the state of the state observer 24 changes greatly and the operation of the servo system 20 becomes unstable may result.

In addition, even if a predicted value of the state observer 24 is corrected only by the lower cylinder value, the prediction error for the upper cylinder value portion cannot be corrected. Then, upper cylinder errors of the predicted position and predicted velocity are caused by a disturbance or the like. The predicted position and predicted velocity are calculated by the state observer 24 with respect to the actual position and actual velocity of the head 10. By calculating a combined position by the combined position generator 25 using the predicted position and predicted velocity containing upper errors, the upper cylinder errors are left as state offsets. The state offset is an error between the combined position and the actual position of the head. As a result, the servo system 20 continues the seek operation of the head 10 without being able to correct the state offset, resulting in a situation in which the head 10 cannot reach the target position (target cylinder).

Thus, in the present embodiment, when servo control (seek operation) is performed by the servo system 20, the MPU 14 corrects the state offset as an error of the combined position by the combined position generator 25 with respect to the actual position of the head 10. The correction method will concretely be described below with reference to flow charts in FIGS. 5 and 6 and FIGS. 7A to 9D.

Figure 5:
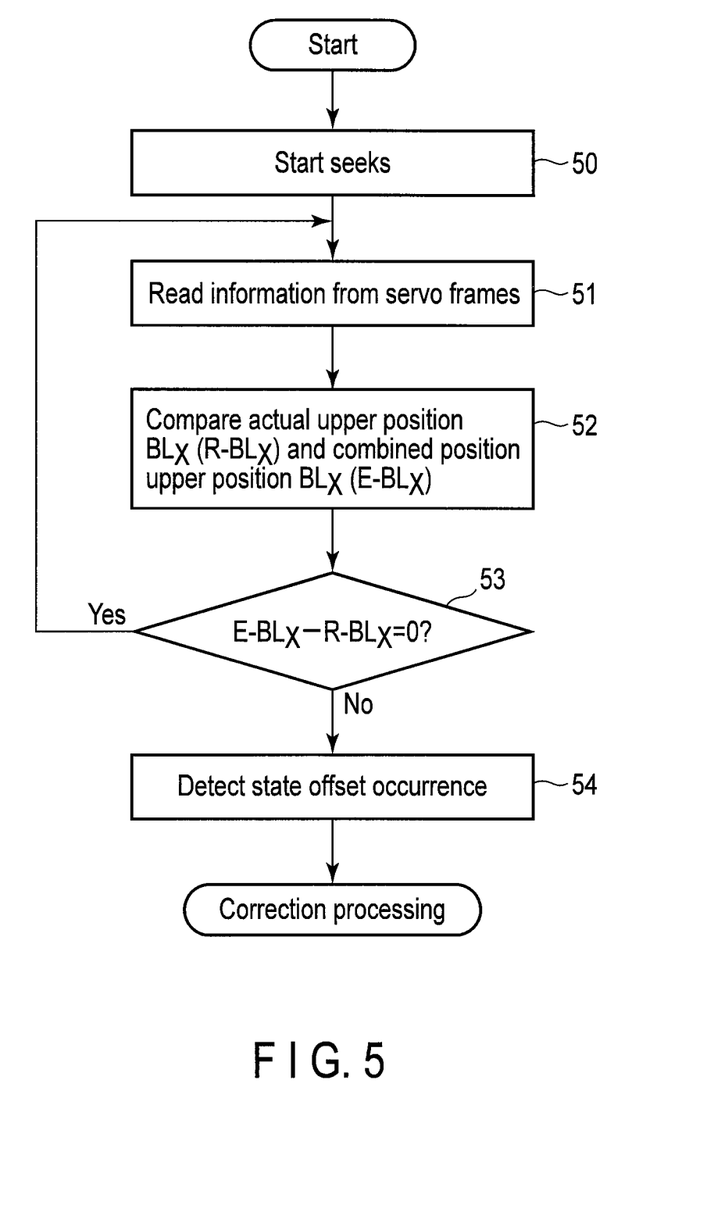
FIG. 5 is a flow chart illustrating an occurrence of a state offset according to the embodiment.

First, as shown in the flow chart in FIG. 5, the MPU 14 starts a seek operation to move the head 10 from some position on the disk 1 to the target position (target cylinder number) (block 50). The MPU 14 reads servo information from the servo frames SVF1 to SVF4 (block 51). At this point, each of the servo frames SVF1 to SVF4 may not be read from the same cylinder and is read, instead, from different cylinders. Actually, servo information is read from the servo frames SVF1 to SVF4 by the read head 10R and decoded by the read channel 12R. The MPU 14 stores servo information read from the servo frames SVF1 to SVF4 in the memory.

The MPU 14 compares the upper cylinder value of the read servo information and the upper value of the combined position corresponding to the upper cylinder value (block 52), that is, the MPU 14 compares the actual upper values BLx (R-BLx)(x=1 to 4) as the read actual position of the head 10 and the combined position BLx (E-BLx).

If there is no error between both values, the MPU 14 determines that no state offset has occurred and continues to read servo information from the next cylinder (YES in block 53). On the other hand, if there is an error, the MPU 14 detects the occurrence of a state offset (NO in block 53, 54).

As shown in FIG. 4, each time servo information is read from the servo frames SVF1 to SVF4, the MPU 14 can acquire the 5-bit lower cylinder value. According to this division method, a position offset of 32n-cylinder and a velocity offset of 32m-cylinder/sample occur as state offsets. n and m are integers other than 0. When a state offset occurs, there arises a difference between the actual upper values BLx (x=1 to 4) obtained by reading the servo frames and the upper values BLx (x=1 to 4) corresponding to the combined position by the combined position generator 25.

Thus, to detect a state offset, the MPU 14 compares the upper value BLx obtained from the read servo frame and the upper value BLx corresponding to the combined position for each sample. From the servo frame SVF1, the value (bit 17 to 20) of BL4 is obtained from the disk 1. The MPU 14 compares the obtained value of BL4 and the corresponding value of BL4 of the combined position and, if the result of comparison is other than 0, determines that a state offset has occurred.

Figure 6:
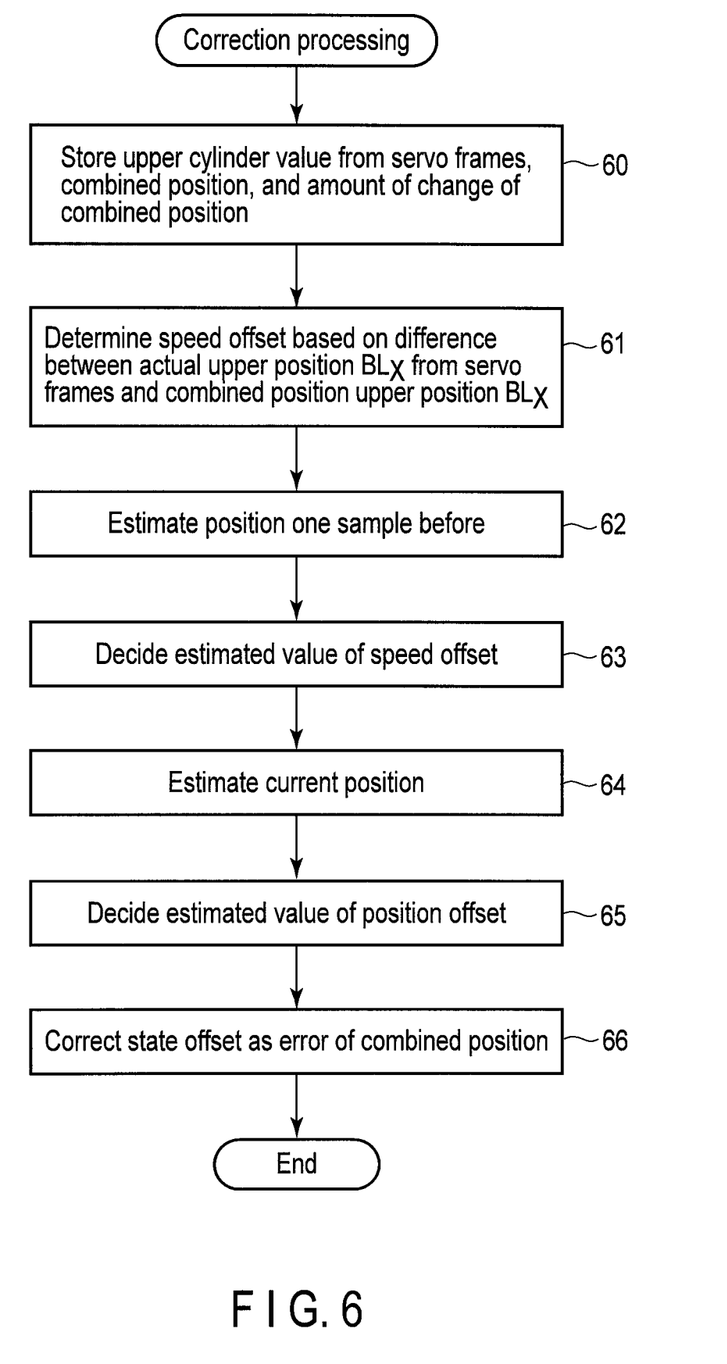
FIG. 6 is a flow chart illustrating processing to correct a predicted position of a state observer according to the embodiment.

Next, as shown in the flow chart of FIG. 6, after a state offset is detected, the MPU 14 performs correction processing of the state offset.

First, after a state offset (a position offset and a velocity offset described later) occurs, the MPU 14 waits until a discrimination servo frame to discriminate the position/velocity offsets is read at least two times. In the meantime, the MPU 14 stores the upper cylinder value, combined position, and amount of combined position changes obtained from a specific servo frame in the memory (block 60).

The discrimination servo frame is a servo frame capable of distinguishing the position offset and the velocity offset based on an error between the upper value BLx of the combined position and the upper value BLx of the actual position read from the servo frame. More specifically, for example, as shown in FIG. 4, the servo frame SVF4 is capable of reading the upper value BL1. An error between the combined position BLx at some point and the actual upper value BLx read from a servo frame is set as diff0 and an error four samples before is written as diff4. That is, the MPU 14 discriminates the occurrence of a position offset if the difference between diff0 and diff4 is 0 and the occurrence of a velocity offset if the difference between diff0 and diff4 is other than 0 based on the current error (diff0) between the combined position BL1 in the discrimination servo frame SVF4 and the actual upper value BL1 and the error (diff4) four samples before.

Next, when a velocity offset occurs, the MPU 14 waits until a specific servo frame is read two times after the occurrence of the velocity offset. If a specific servo frame has been read two times when the discrimination servo frame is read two times, the following processing is performed by the discrimination servo frame. The servo frame that performs this processing is called the processing servo frame.

The specific servo frame is a servo frame that reads an upper block value that needs to be evaluated to determine a velocity offset based on the velocity offset that may have occurred. More specifically, for example, as shown in FIG. 4, the specific servo frame is the servo frame SVF3 capable of reading the upper value BL2. When, for example, a velocity offset of 32-cylinder/sample has occurred, the value of BL1 increases by 4 in four samples, and this cannot be distinguished from the decrease of −12. That is, it is impossible to distinguish the velocity offset of 32-cylinder/sample and the velocity offset of −96-cylinder/sample by only comparing BL1. Because it is necessary to evaluate BL2 to distinguish such velocity offsets, the servo frame SVF3 is determined as a specific servo frame.

The MPU 14 calculates the amount of correction change of a combined position obtained by correcting the amount of change of the combined position for a change due to the amount of velocity offset for all possible velocity offsets. The MPU 14 estimates the current upper block value from the cylinder value of servo information read from each block ranging from the lower block of the upper cylinder to the block obtained by the processing servo frame and the amount of correction change of the combined position. Further, the MPU 14 estimates the position one sample before from the estimated current position and the amount of correction change of the combined position (block 62). That is, the MPU 14 estimates the position when the upper value BL2 is read from the specific servo frame SVF3 for the second time.

Next, the MPU 14 estimates the position when read from the specific servo frame SVF3 for the first time based on the estimated position when read from the specific servo frame for the second time and the amount of correction change of the estimated position and compares the estimated position and the corresponding actual position to decide the amount of velocity offset that yields equal positions as the true velocity offset estimated value (block 63).

The amount of position offset is calculated based on the current position estimated by using the true velocity offset estimated value and the combined position by the combined position generator 25. The MPU 14 estimates the current position based on the value read from the servo frame of each block ranging from the block obtained by the specific servo frame to the top value block, the lower estimated cylinder value, and the amount of correction change of the combined position from the time when the servo frame of each block is read up to now (block 64). The MPU 14 decides the position offset value based on the estimated current position and the combined position by the combined position generator 25 (block 65). Then, the MPU 14 corrects the state offset as an error of the combined position by the combined position generator 25 by reflecting (adding) the decided position offset value and the velocity offset estimated value in (to) the state (predicted position) of the state observer 24 (block 66).

Regarding the correction of a position offset, however, if the position of the head 10 changes greatly during a seek operation, the state of the state observer 24 or the current of the VCM 4 fluctuates, causing a problem of a loud seek sound or the like. Thus, there is another method of first correcting only the velocity offset to change the predicted position of the state observer 24 to a target value and then starting seeks from there again to the target value. Thus, even if the position offset is not corrected, it is necessary to take an estimated value of the position offset into consideration to predict a state in the future by the state observer 24.

In a disk drive that changes the servo information recording frequency in accordance with the zone on the disk 1, it is necessary to switch the R/W channel 12 at an early stage based on the state by the state observer 24 in accordance with switching of the servo information recording frequency. The above processing may be performed for all velocity offsets that are possible for the specific servo frame.

A concrete example of the above processing will be described with reference to FIGS. 7A to 9D.

FIGS. 7A to 7D are diagrams illustrating estimation processing of the amount of state offset. FIGS. 8A to 8F are diagrams illustrating decision processing of a velocity offset. FIGS. 9A to 9D are diagrams illustrating decision processing of a position offset.

The MPU 14 detects the occurrence of a state offset based on the processing shown in the above flow chart of FIG. 5. After the state offset is detected, the MPU 14 waits until the discrimination servo frame is read two times and, in the meantime, stores the combined position by the combined position generator 25, the amount of change of the combined position, and upper cylinder value blocks obtained from the servo frames in the memory based on the processing shown in the above flow chart of FIG. 6. That is, the MPU 14 reads and stores in the memory upper cylinder value blocks including the lower cylinder value from each servo frame in four samples.

The MPU 14 calculates the error (diff0) between the combined position BL1 by the combined position generator 25 and in the second reading from the discrimination servo frame SVF4 and the actual upper value BL1. Similarly, as described above, the MPU 14 calculates the error (diff4) four samples before. If the velocity offset of 32-cylinder/sample is assumed, the difference (diff0−diff4) is 4. At this point, there is no possibility of the velocity offset (diff0−diff4=8) of ±64-cylinder/sample and the velocity offset (diff0−diff4=12) of −32-cylinder/sample and +96-cylinder/sample.

That is, the MPU 14 reads BL2 from the specific servo frame SVF3 two times after a state offset is detected and, when reading from the discrimination servo frame two times, compares the second reading times to start estimation processing of the amount of state offset when the later servo frame is read. In FIGS. 7A to 9D, gBx[t] indicates BLx (x is 1 to 4) as the actual position read from the disk 1 at time k−t. cBx[t] indicates the value BLx of a combined position by the combined position generator 25 at time k−t. eBx[t] indicates the estimated value BLx estimated from a calculation at time k−t.

Figure 7A:
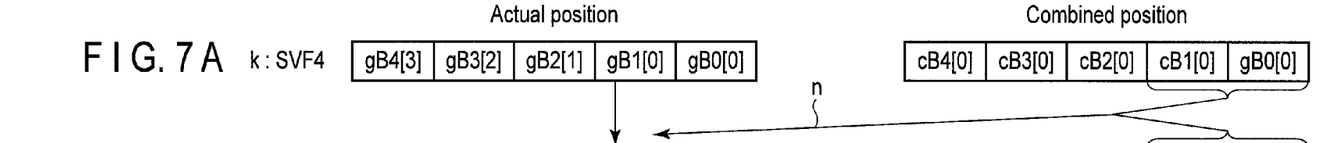
FIGS. 7A, 7B, 7C, and 7D are diagrams illustrating estimation processing of an amount of state offset according to the embodiment.
Figure 7B:
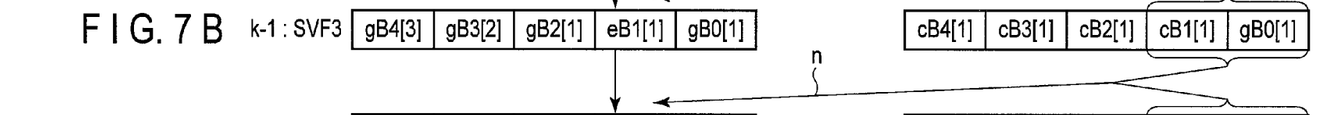
Figure 7C:
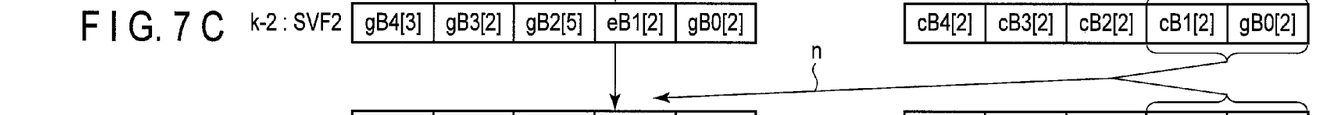
Figure 7D:
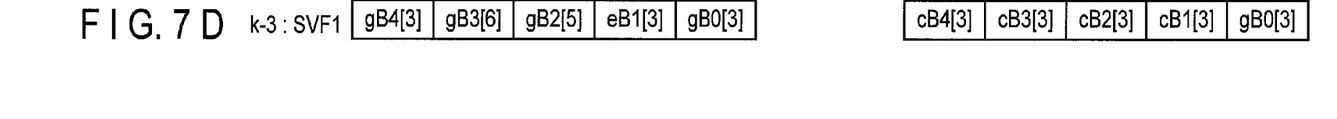

First, as shown in FIG. 7A, the actual position one sample before obtained by subtracting a velocity offset that is possible from the BL1 value (gB1[0]) obtained from the current (time t=0) discrimination servo frame SVF4 and the lower value "(cB1[0]×2^5+gB0[0])−(cB1[1]×2^5+gB0[1])" of the amount of change of the combined position by the combined position generator 25 from one sample before up to now is estimated by calculation. "^n" indicates the n-th power. That is, as shown in FIG. 7B, the estimated value (eB1[1]) of BL1 of the actual position one sample before (k−1) is calculated. Incidentally, the amount of estimation change of the actual position when each velocity offset is assumed is given by "(cB1[0]×2^5+gB1[0])−(cB1[1]×2^5+gB1[1])−32, (cB1[0]×2^5+gB1[0])−(cB1[1]×2^5+gB1[1])+96, ...". Therefore, the estimated value (eB1[1]) of BL1 of the actual position is determined for each velocity offset. Similarly, as shown in FIGS. 7C and 7D, the estimated value (eB1[2]) and the estimated value (eB1[3]) of BL1 of the actual position are calculated.

Figure 8A:
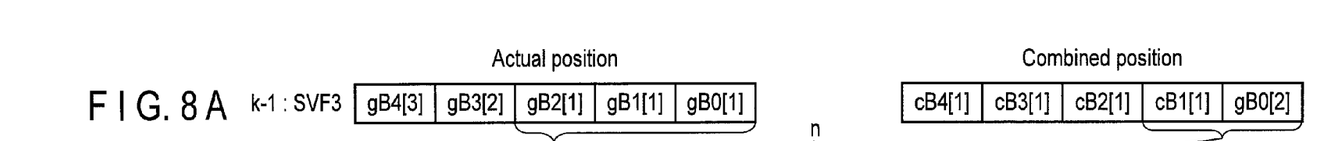
FIGS. 8A, 8B, 8C, 8D, 8E, and 8F are diagrams illustrating decision processing of a velocity offset according to the embodiment.
Figure 8B:
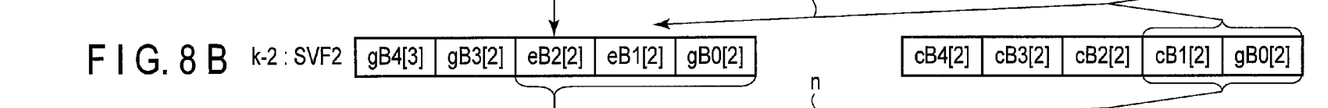
Figure 8C:
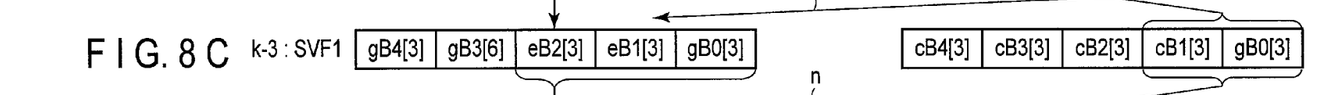
Figure 8D:
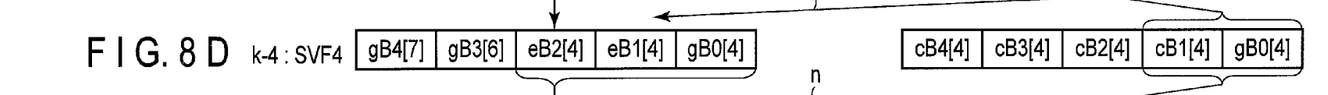

Next, as shown in FIGS. 8A to 8F, after the estimated value (eB1[t]) of BL1 of the actual position of t samples before is calculated, the estimated value (eB2[5]) of BL2 is calculated. The estimated value (eB2[5]) of BL2 is five samples before obtained by subtracting a velocity offset that is possible from the lower value of the actual position one sample before and the lower value of the amount of change of the combined position between five samples before and one sample before. As shown in FIG. 8A, the lower value of the actual position one sample before is "(gB2[1]×2^9+gB1[1]×2^5+gB0[1])".

Also, as shown in FIG. 8A to 8E, the lower value of the amount of change of the combined position between five samples before and one sample before is given by "(cB2[1]×2^9+cB1[1]×2^5+gB0[2])−(cB2[5]×2^9+cB1[5]×2^5+gB0[5])". Incidentally, the amount of estimation change of the actual position when each velocity offset is assumed is given by "(cB2[1]×2^9+cB1[1]×2^5+gB0[1])−(cB2[5]×2^9+cB1[5]×2^5+gB0[5])−32×4, (cB2[1]×2^13+cB1[1]×2^5+gB0[1])−(cB2[5]×2^13+cB1[5]×2^5+gB0[5])+96×4, ... )".

Figure 8E:
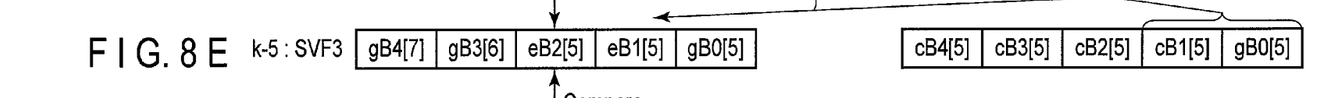
Figure 8F:
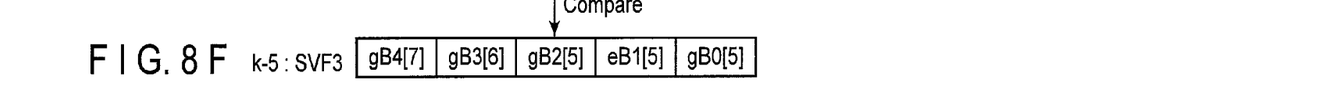

As shown in FIGS. 8E and 8F, the MPU 14 compares the estimated value (eB2[5]) of BL2 five samples before and BL2 (gB2[5]) obtained from the servo frame SVF3 five samples before for each possible velocity offset to decide the velocity offset yielding a matching comparison result as the velocity offset estimated value.

Next, after deciding the velocity offset estimated value, the MPU 14 estimates the position offset. That is, as shown in FIGS. 9A to 9D, the MPU 14 reads values (gB2[1], gB3[2], gB4[3]) of the actual position from the servo frames SVF3, SVF2, SVF1 successively from below for BL2, BL3, BL4 respectively. The MPU 14 estimates the current position from the values of the actual position, cylinder values including lower estimated values (eB1[1], eB1[2], gB1[3] and so on), and the amount of estimation change of the actual position up to now after reading the servo frame of each block.

Figure 9A:
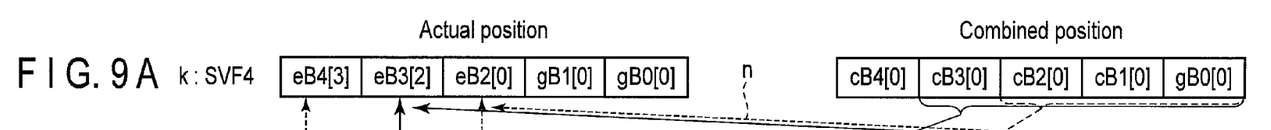
FIGS. 9A, 9B, 9C, and 9D are diagrams illustrating decision processing of a position offset according to the embodiment.
Figure 9B:
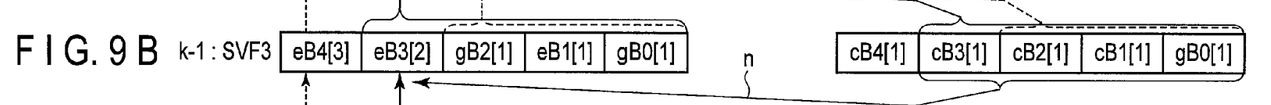
Figure 9C:
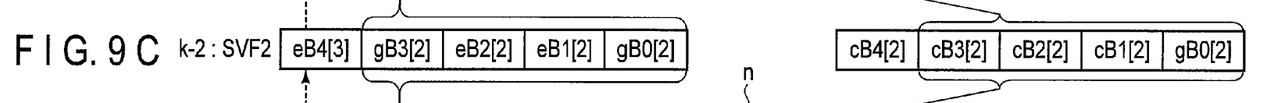
Figure 9D:
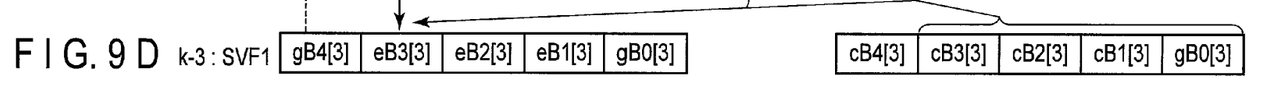

That is, as shown in FIG. 9A, the current (time t=0) positions (eB4[3], eB3[2], eB2[0]) are estimated. The position offset estimated value is calculated by subtracting the current estimated position from the current combined position by the combined position generator 25.

Further, when the estimated value of the state offset is calculated, the MPU 14 performs correction processing of the state offset based on the estimated value thereof. More specifically, the correction processing is processing in which the position offset estimated value and the velocity offset estimated value are subtracted from the position and the velocity of the state observer 24 respectively. However, as described above, correction processing of the position offset may not be performed.

According to the present embodiment, as described above, the upper cylinder value is divided and recorded in a plurality of servo frames and even if a state offset of the position or velocity occurs in a disk drive that performs a seek operation using the combined position generator 25, the current position can correctly be estimated in a short time. That is, the occurrence of a velocity offset is determined after a state offset due to a disturbance or the like is detected, and after a velocity offset estimated value is decided, a position offset estimated value is decided. The state offset can be corrected by reflecting the velocity offset estimated value and the position offset estimated value in the state of the state observer. Therefore, an error of a prediction state of the state observer can efficiently be corrected and a seek operation can reliably be performed. In sum, according to the present embodiment, even if cylinder information is divided among a plurality of servo frames, high-precision seek control that causes the head to reach the target position can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
a disk configured to divide and record servo information to detect a position in a radial direction in a plurality of servo areas;
a read controller configured to read the servo information from each of the servo areas using a head; and
a servo controller comprising a combined position generator including a state observer and a combined position calculator, and configured to calculate a combined position based on the servo information read from each of the servo areas by the read controller and a predicted position calculated by the state observer, and to control a seek operation of the head based on the combined position,
wherein the servo controller is configured to:
store the servo information read during the seek operation in a memory;
determine whether a state offset as an error between an actual position of the head and the combined position has occurred; and
correct the predicted state by the state observer based on the servo information stored in the memory and the combined position when an occurrence of the state offset is detected.

2. The disk storage apparatus of claim 1, wherein
the servo controller further comprises
a calculator configured to calculate estimated value of the state offset based on the combined position and actual position information of the head obtained from each piece of the divided servo information when the occurrence of the state offset is detected.

3. The disk storage apparatus of claim 1, wherein
the servo controller is configured to:
calculate estimated value of a velocity offset contained in the state offset based on an amount of prediction change of the state observer and actual position information of the head obtained from each piece of the divided servo information when the occurrence of the state offset is detected; and
calculate estimated value of a position offset contained in the state offset after the estimated value of the velocity offset is calculated based on an amount of correction change of the combined position calculated from the estimated value of the velocity offset and an amount of change of the combined position and the actual position information of the head obtained from each piece of the divided servo information.

4. The disk storage apparatus of claim 3, wherein
when cylinder information included in the servo information is divided and recorded in each of the servo areas,
the servo controller is configured to:
store the divided cylinder information obtained up to a first servo area of each of the servo areas, the combined position, and the amount of change of the combined position in the memory when the occurrence of the state offset is detected;
estimate position of a second servo area where the cylinder information at a level higher than the cylinder information in the first servo area is recorded based on the cylinder information, the amount of change of the combined position up to the second servo area, and estimated value of the velocity offset that may have occurred;

estimate position of a third servo area based on the position of the estimated second servo area, the cylinder information obtained from the second servo area, the amount of change of the combined position from the second servo area to the third servo area, and the estimated value of the velocity offset that may have occurred; and calculate the estimated value of the velocity offset based on the cylinder information obtained from the third servo area and the estimated position of the third servo area.

5. The disk storage apparatus of claim 4, wherein the servo controller is configured to:

calculate an amount of correction change of the combined position calculated based on the estimated value of a velocity offset, from upper cylinder information obtained from each of the servo areas in order from lower information in the cylinder information as the position in the first servo area and the amount of change of the combined position up to the first servo area; and calculate the estimated value of the position offset based on the estimated value of a current position of the head calculated based on the amount of correction change of the combined position and the combined position up to the first servo area.

6. The disk storage apparatus of claim 4, wherein the servo controller is configured to:

compare the divided cylinder information obtained from each of the servo areas and the cylinder information corresponding to the combined position; and detect the occurrence of the state offset when a mismatching comparison result follows.

7. The disk storage apparatus of claim 4, wherein the servo controller is configured to:

set the primal servo area as the first servo area allowing to distinguish between the position offset and the velocity offset when the cylinder information of as many samples as needed to calculate the estimated value of the state offset is read.

8. The disk storage apparatus of claim 4, wherein the servo controller is configured to:

set the second servo area as a reference servo area to calculate the estimated value of the velocity offset;

set the third servo area as the servo area to be compared when the estimated value of the velocity offset is calculated; and set also as the servo area to obtain the cylinder information before sampling to obtain upper cylinder information of the second servo area.

9. A method of servo control applied to a disk storage apparatus including:

a disk configured to divide and record servo information to detect a position in a radial direction in a plurality of servo areas;

a read controller configured to read the servo information from each of the servo areas using a head; and a servo controller configured to contain a combined position generator including a state observer and a combined position calculator, calculate a combined position based on the servo information read from each of the servo areas by the read controller and a predicted position calculated by the state observer, and control a seek operation of the head based on the combined position, the method comprising:

storing the servo information read during the seek operation in a memory;

determining whether a state offset as an error between an actual position of the head calculated based on the servo information and the predicted position by the state observer has occurred; and correcting the predicted state by the state observer based on the servo information stored in the memory and an estimated value of the state offset when an occurrence of the state offset is detected.

10. The method of claim 9, further comprising:

calculating estimated value of the state offset based on the combined position and actual position information of the head obtained from each piece of the divided servo information when the occurrence of the state offset is detected.

11. The method of claim 9, further comprising:

calculating estimated value of a velocity offset contained in the state offset based on an amount of prediction change of the state observer and actual position information of the head obtained from each piece of the divided servo information when the occurrence of the state offset is detected; and calculating estimated value of a position offset contained in the state offset after the estimated value of the velocity offset is calculated based on an amount of correction change of the combined position calculated from the estimated value of the velocity offset and an amount of change of the combined position and the actual position information of the head obtained from each piece of the divided servo information.

12. The method of claim 11, further comprising:

when cylinder information included in the servo information is divided and recorded in each of the servo areas, storing the divided cylinder information obtained up to a first servo area of each of the servo areas, the combined position, and the amount of change of the combined position in the memory when the occurrence of the state offset is detected;

estimating position of a second servo area where the cylinder information at a level higher than the cylinder information in the first servo area is recorded based on the cylinder information, the amount of change of the combined position up to the second servo area, and estimated value of the velocity offset that may have occurred;

estimating position of a third servo area based on the position of the estimated second servo area, the cylinder information obtained from the second servo area, the amount of change of the combined position from the second servo area to the third servo area, and the estimated value of the velocity offset that may have occurred; and calculating the estimated value of the velocity offset based on the cylinder information obtained from the third servo area and the estimated position of the third servo area.

13. The method of claim 12, further comprising:

calculating an amount of correction change of the combined position calculated based on the estimated value of a velocity offset, from upper cylinder information obtained from each of the servo areas in order from lower information in the cylinder information as the position in the first servo area and the amount of change of the combined position up to the first servo area; and calculating the estimated value of the position offset based on the estimated value of a current position of the head calculated based on the amount of correction change of the combined position and the combined position up to the first servo area.

14. The method of claim 12, further comprising:
comparing the divided cylinder information obtained from each of the servo areas and the cylinder information corresponding to the combined position; and
detecting the occurrence of the state offset when a mismatching comparison result follows.

15. The method of claim 12, further comprising:
setting the primal servo area as the first servo area allowing to distinguish between the position offset and the velocity offset when the cylinder information of as many samples as needed to calculate the estimated value of the state offset is read.

16. The method of claim 12, further comprising:
setting the second servo area as a reference servo area to calculate the estimated value of the velocity offset;
setting the third servo area as the servo area to be compared when the estimated value of the velocity offset is calculated; and
setting also as the servo area to obtain the cylinder information before sampling to obtain upper cylinder information of the second servo area.

* * * * *